Dec. 26, 1961 D. A. BUZZELL ETAL Re. 25,102

MEANS AND METHOD FOR MOLDING CONCRETE SECTIONS OF HYDRAULIC CONCRETE STRUCTURES

Original Filed Feb. 20, 1953 3 Sheets-Sheet 1

INVENTORS
DOW A. BUZZELL
RALPH L. BLOOR
BY George F. Wintermeyer
Joseph H. Comer
ATTORNEYS

MEANS AND METHOD FOR MOLDING CONCRETE SECTIONS
OF HYDRAULIC CONCRETE STRUCTURES

Original Filed Feb. 20, 1953 3 Sheets-Sheet 2

INVENTORS
DOW A. BUZZELL
RALPH L. BLOOR
BY George C. Westerman
Joseph M. Conner
ATTORNEYS INVENTORS
DOW A. BUZZELL
RALPH L. BLOOR
BY George F. Mottman
Joseph H. Comer
ATTORNEYS United States Patent Office Re. 25,102
Reissued Dec. 26, 1961

25,102

MEANS AND METHOD FOR MOLDING CONCRETE SECTIONS OF HYDRAULIC CONCRETE STRUCTURES

Dow A. Buzzell, 1307 Gary Court, Falls Church, Va., and Ralph L. Bloor, 3212 P St. NW., Washington, D.C.

Original No. 2,961,731, dated Nov. 29, 1960, Ser. No. 338,174, Feb. 20, 1953. Application for reissue May 12, 1961, Ser. No. 110,318
5 Claims. (Cl. 25—131)
(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government for governmental purposes, without payment to us of any royalty thereon.

The present invention provides certain improvements in the construction of massive concrete structures such as concrete dams or other large concrete hydraulic structures which customarily are built or molded in sections provided with expansion joints between the sections to accommodate expansion or contraction of the sections resulting from thermal atmospheric changes, or temperature changes in a water head restrained by the particular hydraulic structure.

In the erection of such concrete hydraulic structures, the sections of concrete are produced by pouring the concrete into wooden forms which are of the contour and internal dimensions of the size of the concrete structure which is to be poured. The erection and dismantling of these wooden forms for, and subsequent to, the pouring of each concrete section of the structure entails the expenditure of large amounts of labor and time, resulting in high costs.

The pouring of such concrete sections into the forms is carried out in a manner which provides the above-mentioned expansion joints between contiguous ends of adjacent sections. Where the structure is designed to impound a quantity of water, such as in the case of dams, or the bottom and sides of reservoirs, it is necessary to provide each expansion joint with means for preventing leakage of water through the said joints. Such means, designated as waterstops, bridge the joints and are retained in place by being embedded in the concrete of adjacent sections.

Such waterstops extend substantially coincidently with the height of the hydraulic structure, or at least to such height as will correspond to the depth of the water expected to be restrained, and the waterstops also may extend below the bottom of the structure and into the foundation for the structure. The conventionally employed waterstops may be made from various materials, either metallic or non-metallic, one type of such waterstops being made of rubber, or resilient plastic material, molded with bulbous longitudinal side extremities interconnected by a parallel sided web. The bulbous sides extend along the entire length of the waterstop and form anchoring means for the waterstop when embedded in the concrete of the structure. The parallel-sided web portion then spans the expansion joints between the sections for the height of the structure as aforesaid, and blocks the passage of water through the joints.

Resilient rubber waterstops of this bulb type have proved to be very satisfactory in service, but their installation has been cumbersome and costly, it being the conventional practice to embed one of the bulbous sides of the waterstop in the first pour of concrete with the opposite bulbous side and a portion of the web projecting from the face of the first pour, and either to form around the projecting part to provide a recess for receiving this projecting part, or alternatively, to split the mold form, both of which are expensive and time-consuming procedures.

The present invention provides improvements which are designed to simplify the usual procedure in eliminating the costly practice of forming around the waterstop or splitting the mold form by making the mold form straight or continuous throughout, and to eliminate the conventional dismantling and reassembling of the timbers from which the mold forms are constructed. The improvements of the present invention comprise constructing a continuous partial mold form which corresponds to the front and rear faces of the entire monolithic concrete structure being built, and commensurate in length therewith, and pouring the concrete for the first pour into a complete form comprising a removable transverse end wall which interconnects the front and rear elements of the form, which removable end wall molds an end surface of a section, this removable end wall being continuous and straight and capable of being dismantled and reerected progressively along the length of the parallel front and rear walls of the erected form for the pouring of successive sections, one of which sections is allowed to set sufficiently to be self-sustaining before the transverse end walls of the molding form are shifted to a new and succeeding position. Thus, in accordance with the present improved practice, a first concrete section is poured into a complete wooden form, all sides of which are continuous and straight, and after the poured section has become self-sustaining, the transverse end walls of the form are shifted into a new position for receiving a second poured section adjacent to the first, the end face of the first poured section being used as part of the form for the second section which is poured directly against the end surface of the first-poured section, which has been uncovered by the moving of the transverse straight and continuous form wall into its next position for defining the terminal end wall of the second section. Upon setting, the second section contracts, leaving a space or slit, known as a contraction or expansion joint between the first and second poured sections. This is repeated between each successively-poured section which joints extend through the entire height of the completed hydraulic structure, and which are sealed water-tight throughout by the use of the waterstops which have been referred to previously.

Also, as has been pointed out above, the present improvements include the use of a straight or continuous transverse wall for the molding forms, the customary forming around the waterstops or the use of split transverse walls for the mold forms for the reception of the waterstops being eliminated. In order to accomplish this elimination and to use a straight and continuous transverse form wall, which simply is shifted into successive adjusted positions for succeeding pours of concrete, the present invention utilizes the conventional resilient bulb-type waterstop which is constrained by clips removably secured to the straight continuous transverse wall of the molding form into a position such that one part of the waterstop will become embedded in the first pour, the part of the waterstop which will become embedded in the second pour being held in a position substantially parallel to the joint face of the pour and against the inner side of the straight, continuous, movable transverse wall of the molding form. After the pouring of the first section has been completed and the section has set sufficiently to be self-sustaining, this movable straight transverse wall of the molding form is moved into a second position for receiving the second pour, and the next waterstop is secured in place in the same manner as has been described for the first-mentioned waterstop; whereupon, responsively to the shifting of the position of the said transverse mold wall, the inherent resiliency of the waterstop causes the previously restrained and bent portion of the waterstop to straighten out responsively to release of the tension therein resulting from said restraint, so that the previously bent and restrained portion of the waterstop will straighten out and project from the end surface of the first-poured section in alignment with that portion of the water-stop which has become embedded in the first-poured section.

Further objects and advantages of the present improvements will become apparent as the description proceeds, and the features of novelty will be pointed out in particularity in the appended claims.

In the accompanying drawings, which illustrate several embodiments of the present improvements, FIG. 1 is a perspective view of adjacent concrete sections of a concrete dam which have been produced in accordance with the present improvements;

Figure 1:
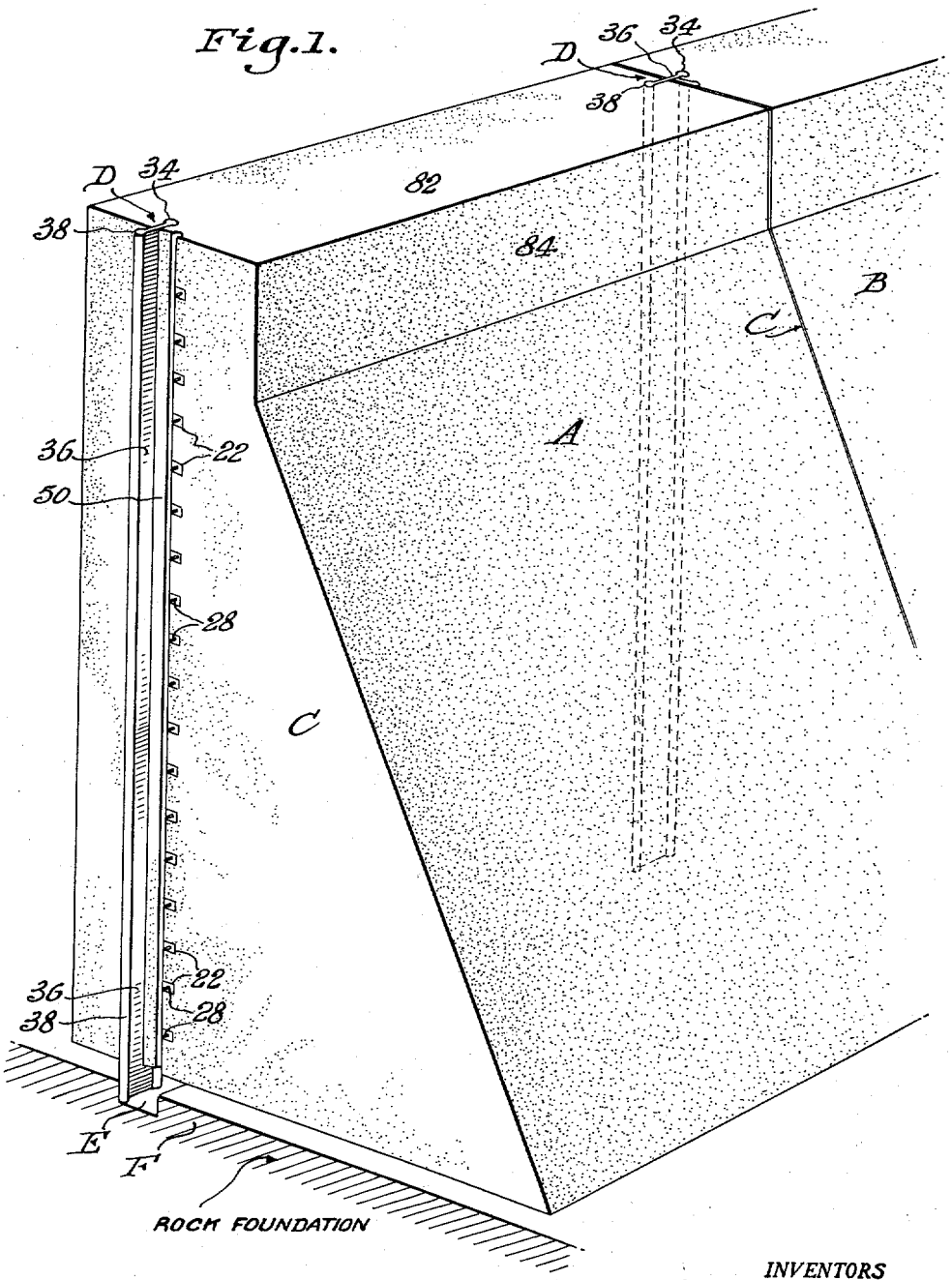
Figure 9:
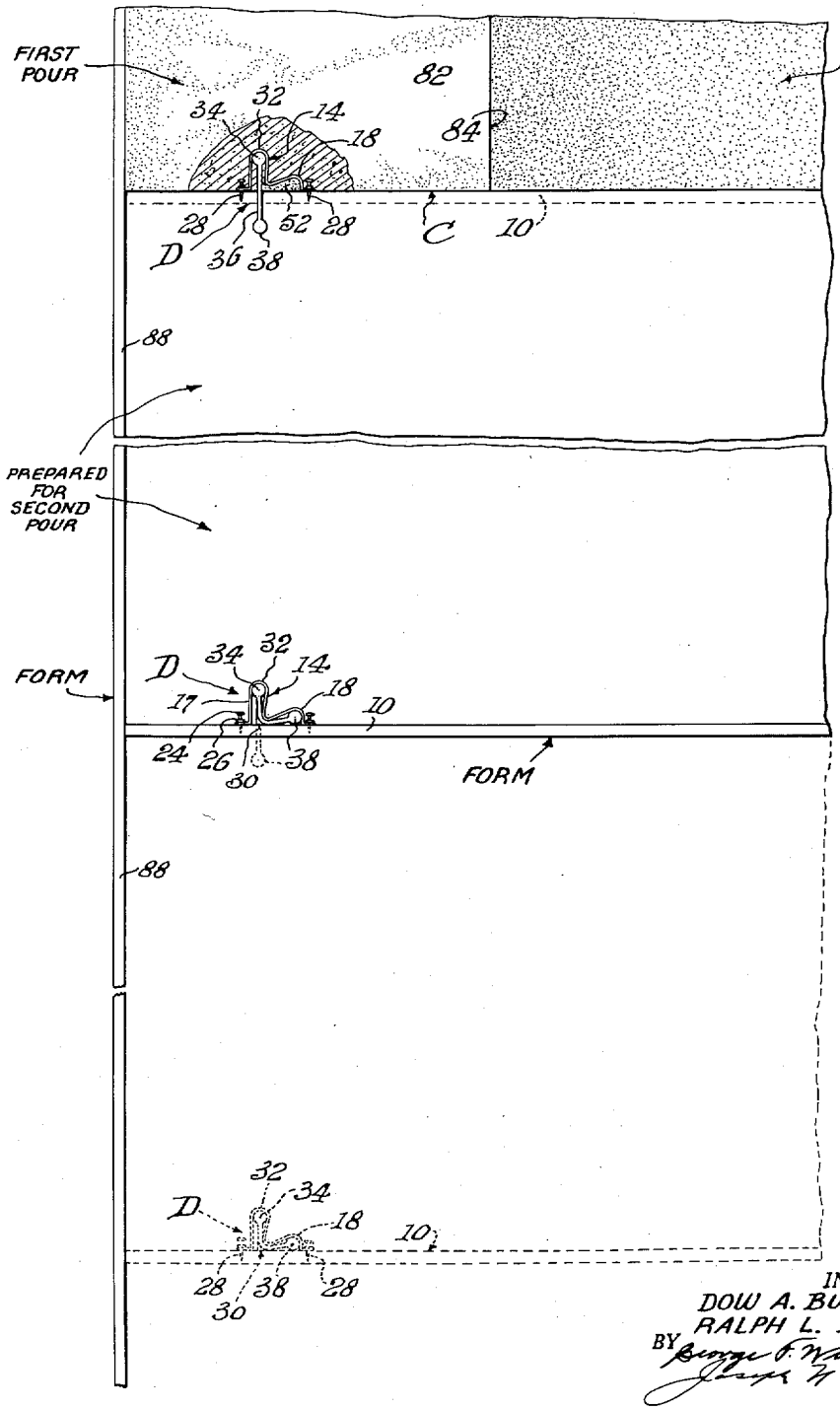

FIG. 9 is a diagrammatic plan view of a mold form for molding concrete sections of a dam such as the section shown in FIG. 1, the view indicating successive placements of the adjustable straight and continuous transverse wall following completion of successive pours of concrete, and also indicating the straightening of successive waterstops from restrained and tensioned position against the adjustable transverse wall of the mold form to expanded and straightened position of the waterstops as the transverse wall of the form is moved to successive positions between previously erected front and rear walls of the form which extend concurrently with the length of the completed dam structure, the view showing a portion of the first mold broken away, but the first section completely poured, the next mold being indicated as being complete with the movable wall in place ready to receive a second pour, the next form defining by dotted lines the position of the movable transverse wall when shifted or re-erected in position for receiving a third pour for a third section, the view being broken for accommodation of its showing to the size of the paper.

Referring more particularly to the drawings, A and B represent adjacent sections of a hydraulic concrete structure such as a dam, each section being composed of concrete and separated by a joint C containing a bulb-type waterstop D that extends through the height of the structure and, preferably, down into a notch E of the foundation F of the structure.

Figure 2:
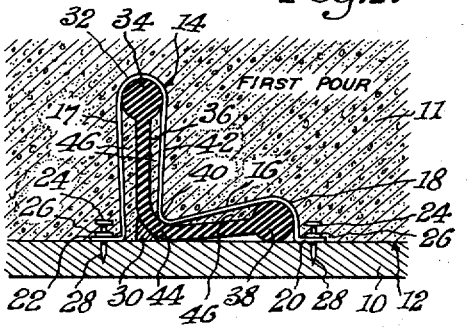
FIG. 2 is a fragmentary horizontal section illustrating an initial stage of installing a bulb-type waterstop in accordance with the present improvements, the view illustrating the restrained position of the waterstop following completion of the first pour of concrete and before removal of the continuous and straight transverse wall of the mold.
Figure 3:
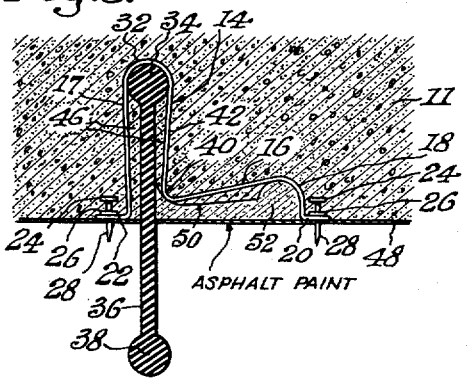
FIG. 3 is a view similar to FIG. 2, but showing the said transverse wall of the molding form removed.

In the installation of the bulb-type waterstops in accordance with the present invention, reference numeral 10 represents a fragment of a straight and continuous transverse end wall of a concrete molding compartment of a wooden form in which is poured the first pour 11 of concrete, which is to produce one of the sections, for example, section A of the assembly shown in FIG. 1, the inner surface of the said transverse end wall 10 being designated at 12. Along this inner surface 12 at suitably closely spaced vertical intervals are received substantially U-shaped clips 14 of suitable spring metal, one arm of which, designated at 16, is substantially longer than the other and slopes inwardly from the said inner surface 12 to an arcuately curved end portion 18 which terminates in a securing flange 20. The other arm 17 of the clip terminates in an oppositely extending securing flange 22, these flanges 20 and 22 being nailed to the inner surface of the transverse end wall 10 by double-headed nails, which double heads are designated at 24 and 26, a shank portion 28 of the nails projecting into the transverse compartment wall 10. Also secured to the inner side 12 of this movable or adjustable wall 10, and between the parallel arms of the clips, is a continuous guide and stop strip 30, having a cross-sectional shape which approximates an isosceles right-angle triangle, the hypotenuse of which lies between the legs of the clips. The loop 32 of each clip receives a bulbous side 34 of the resilient waterstop 36, which has an opposite bulbous side 38, similar to the side 34 and which is retained between the arcuate end portion 18 of the clip arm 16 of each of the clips. The long clip arm 16 defines an acute angle 40 with its portion 42 that is parallel with the opposite clip arm 17, the angle bend 40 and the guide strip 30 cooperating to produce a substantially right angle elbow bend 44 in the waterstop 36. The length of the waterstop when installed will approximate the height of the finished hydraulic structure for sealing the intervening joints between the structural sections. The spaced clips 14 restrain the waterstop against the inner side 12 of the transverse mold wall 10, as shown in FIG. 2. The resilient waterstop 36, being thus maintained under tension, is continuously being urged by its inherent resiliency towards its straightened position as shown in FIG. 3, which it assumes responsively to removal of the straight and continuous movable compartment wall 10 of the mold form, which is done subsequently to completion of the first pour 11 of the concrete and after the concrete of this first pour has set sufficiently to be self-sustaining. The primary purpose of the strip 30 is to prevent entry of concrete behind the bend in the waterstop so that the latter can assume the straight position of FIG. 3, as otherwise the projecting portion of the waterstop would be off-set relatively to the embedded portion, and it is necessary that the waterstop assume a straight position when the wall 10 is removed. Secondarily, of course, the strip 30, in conjunction with the acute angle bend 40 in the clip arm 16, compresses the waterstop and increases the tension mentioned above which obviously is at its maximum at the elbow bend 44 of the waterstop and in the portions of the waterstop immediately adjacent to this bend on both sides thereof. This first pour 11 when completed, makes the section A of the completed hydraulic structure shown in FIG. 1. During the pouring of the concrete, obviously the open spaces between the waterstop and the clips 14 become filled with concrete, as is indicated at 46, so that the portions of the waterstop which extend into the concrete pour become embedded in the concrete, as well as the clips 14, and the waterstop is held anchored in the completed section by its embedded bulbous side 34, thus holding the waterstop permanently in position in the completed monolith section.

After the first concrete pour 11 has been completed and has set at least sufficiently to be self-sustaining, the transverse compartment wall 10 is removed, and the entire resulting exposed end surface of the molded section is coated with a suitable composition such as asphalt paint which dries into a hard, but yielding, waterproof coating, which is indicated at 48 on FIGS. 2 and 3, and which constitutes a separator coating for producing the joint C between adjacent sections of the finished hydraulic structure. This removal of the transverse compartment wall 10 enables the waterstop to spring from its bent position of FIG. 2 into the straight position of FIG. 3, thus eliminating the elbow bend 44 and relieving the compressional tension in the waterstop, it being recalled that the waterstop is composed of rubber or some other suitable resilient and flexible material. The resulting embedded portion of the waterstop together with the clips and nails are retained permanently in the concrete section, there being left a continuous recess 50 extending through the height of the concrete structure which corresponds to the bent portion and bent contour of the waterstop. This recess 50 is filled with a concrete drypack 52.

After the compartment wall 10 has been removed from the superficially-set first pour and the asphalt paint coating has been applied over the entire face of the first poured section, and when this straight and continuous compartment wall 10 has been re-erected in its next location, the second pour 54 is made using the end face of the first-poured section, which has been exposed by removing the wall 10, as part of the molding compartment for the second section, contraction of which during setting opens a slit or contraction joint between the adjacent sections, indicated at C, as shown in FIG. 1. When the wall 10 has been removed as aforesaid, the double heads 24 and 26 of the securing nails prevent any possibility of the nails pulling out with this wall 10 as the latter is dismantled or pulled from the cast section with attendant potential dislocation of the clips 14 and possible displacement of the waterstop from its embedded anchorage in the concrete section in the event that the latter has not solidified to a sufficient extent and depth to result in positive anchoring of the waterstop in the concrete of the pour. It will be apparent that the clips, nails, and waterstops are entirely embedded in concrete upon completion of pours 11 and 54, except for such small lengths as may be exposed within the short distance of separation between the resulting sections that corresponds to the width of the intervening contraction joint. The application of the asphalt paint coating 48 to the surface of the first-poured section produces a separating surface coating between the first and second pours, and prevents bonding of the concrete of the second pour to the concrete of the first pour which might occur in the absence of this separator coating, as well as waterproofing and sealing the dry pack 52 in place in the recess 50.

Figure 4:
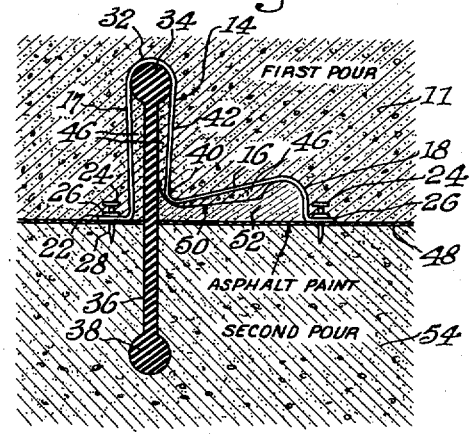
FIG. 4 is a view similar to FIG. 3, but showing the position of the waterstop following the second concrete pour.
Figure 5:
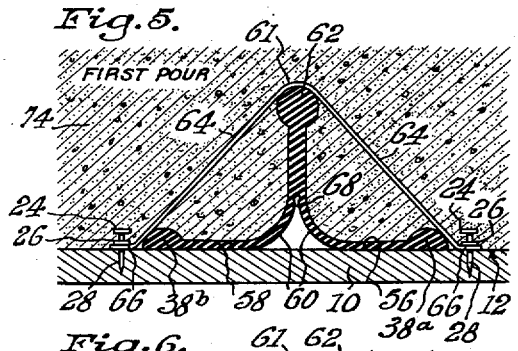
FIG. 5 is a view similar to FIG. 2 but showing a modified form of clip securing a split type of a bulb-type waterstop, the transverse end wall of the mold for the first concrete pour being still in position.
Figure 6:
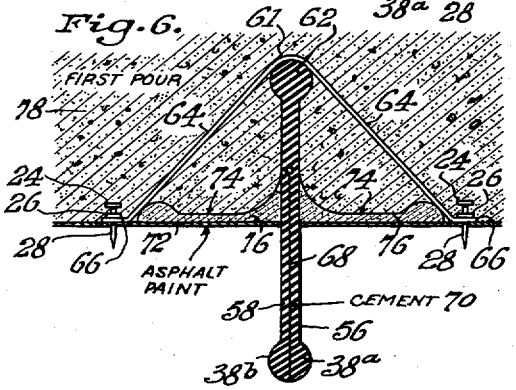
FIG. 6 is a view showing the conditions following removal of said wall of FIG. 5.

In FIGS. 5 and 6 of the drawings, there is shown a modified embodiment of the waterstop and the retaining clip in which the waterstop is slit longitudinally and partially through its width to form two equal arms or branches 56 and 58 which are separated as shown in FIG. 5, these arms being bent into corresponding approximately equal arcs 60, and they are restrained against the inner surface 12 of the wall 10 in parallelism thereto, as is indicated on FIG. 5. The inner bulbous side of the waterstop is received and held in an arcuate apex 61 of the restraining clip, the arc of which is a substantially circular arc having a radius equal to the radius of the bulbous side 62 of the waterstop, the arcuate apex 61 of the clip being concentric with the bulbous side 62 of the waterstop and being of a sufficient length to enclose the said side 62 of the waterstop to a substantial extent. This arcuate portion or apex 61 of the clip connects two equal sides 64 of the clip, these sides terminating in oppositely directed attaching flanges 66 which are nailed to the inner surface 12 of the compartment wall 10 of the mold form by double headed nails, as has been described in connection with the previously described modification. The sides 64 of the clip cooperate with the inner side 12 of the said wall 10 to restrain the arms 56 and 58 of the resilient waterstop against the said inner side 12 of the wall 10 by engagement with each half 38a and 38b of the slit bulbous side of the waterstop which projects from the first concrete pour after the wall 10 is removed. When the foregoing assembly has been completed, the first pour of concrete is made, and after sufficient setting thereof, the wall 10 is removed, and the inherent resiliency of the waterstop causes the branches 56 and 58 to straighten out, as shown in FIG. 6, closing the slit 68 in the waterstop. A layer or coating 70 of rubber cement is applied to the intervening surfaces of the slit for securing together the straightened arms 56 and 58 of the waterstop. A layer 72 of asphalt paint is applied over the face of the resulting molded section which has been exposed by removal of the compartment wall 10, and the recess 74 which corresponds to the extended branches of the waterstop, is packed with a concrete dry pack 76 in the same manner as has been described above in connection with FIGS. 2 through 4. This first pour is indicated at 78, and as the case with the previously described modification, the clips and the inwardly-extending portion of the waterstop are embedded in the resulting concrete section. The second, or adjacent concrete pour then is made as has been described above in connection with FIGS. 2 through 4, after re-erection of the compartment wall 10 in its succeeding location.

Figure 7:
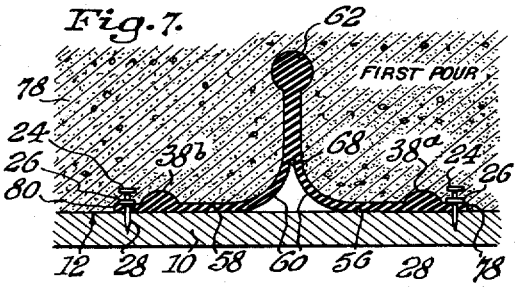
FIG. 7 is a view similar to FIGS. 2 and 5, but showing a still further modified form of waterstop, which eliminates the use of a clip and in which the split bulb-type waterstop is secured directly to the removable end wall of the molding form.
Figure 8:
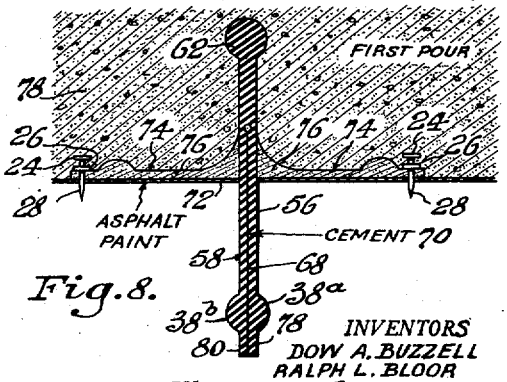
FIG. 8 is a view of the modification of FIG. 7, with the said end wall removed.

The modification of FIGS. 7 and 8 is very similar to that of FIGS. 5 and 6, but it enables the elimination of the retaining clips of FIGS. 5 and 6 through the provision of a securing flange formed during molding of the waterstop. When this flange and bulbous side of the waterstop are slit partially through as described above in connection with the modification of FIGS. 5 and 6, thereby forming the arms 56 and 58, the resulting flanges or tips 78 and 80 comprise attaching means for arms to the inner side of the compartment wall 10 when the said arms have been separated, double-headed nails being driven through these tips 78 and 80 into the transverse wall 10, thus nailing the tensioned separated arms directly to the inner surface 12 of the said wall 10. When the said wall is removed, the tension in the separated arms 56 and 58 is released, and the resiliency of the material of which the waterstop is composed straightens these arms into the straight and substantially unstressed condition similar to that taken by the modification of FIGS. 2 through 4.

Reference now may be had to FIG. 9, this view showing the first structural section A as being completely poured, and the movable transverse compartment wall 10 moved into its next position and re-erected to complete the form for the second pour. The original position of the wall 10 for completing the form for molding the first-poured section is indicated by dotted lines in FIG. 9, the top of which section is indicated at 82 and the front face of the top of the section is designated at 84, the end of the first-poured section exposed by the shifting of the movable wall 10 being designated by reference C, as has been mentioned above herein. The waterstop D, anchored in the concrete of section A by its embedded bulbous side is shown in its expanded position in FIG. 9 which position it assumes responsively to the moving of the movable compartment wall 10 from the first to the second position thereof, this moving also uncovering the end C of the first-poured section A which forms a compartment end complementary to the movable wall 10 for receiving the concrete of the second section during pouring thereof. It will be understood that the wall 10 has applied to it a waterstop in the above-described bent configuration as has been noted in FIGS. 2 through 8 in each position of adjustment of the wall 10 prior to the pouring of the corresponding section. It will be understood also that the series of sections is molded by pouring each section into a form of which the front and rear surfaces of the sections are formed by permanently mounted front and rear wall mold form elements, one of which is designated at 88, which elements are erected for the full length of the structure being built, the individual sections being defined by the movable transverse compartment wall 10, the expansion joints that are formed between the succeeding sections being sealed watertight by the waterstop as has been described in detail above herein.

Throughout the foregoing description, the various references to the movable or adjustable compartment wall 10 do not mean that this wall is intended to be only a one-piece element, but in shifting its successive positions to receive successive pours, it is to be dismantled and reassembled in each successive location. However, in the reassembling of this wall structure in such successive locations, the same materials and elements of construction are re-used with replacement of only such parts with new timbers or parts as may have become excessively split or damaged otherwise beyond limits of utility during previous dismantling of the wall structure. Such reuse of the same materials results in substantial economies both as to material and labor, and also as to the amount of time required in erecting requisite forms for receiving the pours of concrete. Obviously, however, the concept of the present invention is not intended to exclude such cases where the wall 10 is sufficiently small to be constructed as an integral unit and moved as a portable integral unit from one location to another as described above.

Having thus described our invention, what we claim as new and wish to secure by Letters Patent is:

1. A mold form for molding successive sections of a sectional hydraulic structure, which comprises an adjustable one-piece mold wall positionable as a unit at a series of successive locations extending between oppositely disposed fixed mold walls, each location of the adjustable wall defining a section of the structure and a thermal expansion joint between successive sections, the adjustable mold wall having an outer surface and an inner surface against which self-setting structural material is adapted to be directly poured, a resilient elastic water-stop mounted on the inner surface of the adjustable wall and having a portion disposed substantially perpendicular to the inner surface of the wall and another portion bent under tension against the inner surface of the wall and parallel thereto, restraining clip means enclosing both the perpendicular and bent portions of the water-stop, and releasable securing means holding the clip means to the said wall, the said clip means and perpendicular portion of the water-stop becoming embedded in structural material poured into the mold form, the bent portion of the water-stop automatically flipping into alignment with the perpendicular portion responsive to separation of the adjustable mold wall from the securing means for the clip means when the poured structural material has hardened in the mold form.

2. The construction defined in claim 1 wherein the resilient water-stop has a length approximately equal to the height of the adjustable mold wall.

3. The method of molding successive concrete sections for building hydraulic concrete structures, the sections having intervening joints between adjacent ends of successive sections for accommodating thermal dimensional changes in the sections during service and having flexible resilient waterstops bridging the joints substantially throughout the height of the structure for preventing leakage of water through the joints, which method comprises sequentially erecting a mold form for successive sections which includes fixedly positioning continuous side members coextensive with the length of the structure to be erected and corresponding to the front and rear faces of the completed structure, adjustably mounting a transverse movable wall between the fixedly positioned side members, the transverse wall having an inner surface defining an end wall of a molded section, mounting a flexible resilient waterstop on the inner surface of the wall with a longitudinal lateral portion projecting from the said inner surface into the form, restraining an opposite longitudinal lateral portion of the water-stop against the said inner surface and parallel thereto, pouring concrete into the resulting form until the form is filled therewith and the inwardly projecting portion of the waterstop is embedded in the concrete, hardening the resulting poured concrete until it becomes self-sustaining, removing the movable wall from its former position into a successive position defining a successive section and uncovering the resulting end of the previously poured section and also releasing the restrained portion of the waterstop for alignment with the embedded portion thereof, pouring a successive section directly against the uncovered end of the previously poured section as a part of the successive mold form and embedding the aligned portion of the waterstop in the concrete of the successive section, and allowing the concrete of the successively poured section to shrink away from the said end of the previously poured section as the concrete sets, thereby producing a joint between the sections for accommodating thermal dimensional changes in the sections during service while maintaining the joint sealed by the waterstop which has longitudinal sides anchored in the concrete of the successive sections.

4. The method as defined in claim 3, including packing, with a dry concrete packing, the recesses in the exposed end of the previously molded section, which recesses result from releasing the restrained portions of the waterstop, and coating the exposed end with a waterproof coating for enabling the succedingly poured section to shrink away from the said exposed end for forming the intervening joint between the sections while maintaining the waterstop anchored in the concrete of both sections.

*5. A waterstop barrier structure for bridging a joint between a pair of construction members, comprising: a rubbery, flexible, elongated waterstop strip having a width between opposite side edges considerably greater than its thickness and when in position in the construction members having its opposite side portions arranged on opposite sides of the joint and embedded in said construction members, the strip being initially split at one side portion along the length thereof into two superimposed parts normally contacting when in said position in said construction members with the split extending in a flat plane from one of said edges to an area intermediate said side edges, the split parts of said one side portion being bendable apart to extend away from each other in a common plane that is substantially at right angles to the other of said side portions and bear against a solid form during embedding of the other of said side portions in one construction member and being then bendable into said superimposed contacting relationship prior to said embedding of said one side portion in the other construction member, each of said edges being provided with a bulbous portion of a thickness greater than said thickness of the strip in order to aid in preventing the barrier strip from pulling away from said construction members, the bulbous portion on said one edge being divided by said split into two sections that extend away from each other.*

(References on following page)

References Cited in the file of this patent or the original patent

UNITED STATES PATENTS

| | | |
|---|---|---|
| 872,602 | Zeiser | Dec. 3, 1907 |
| 1,901,392 | Fredericks | Mar. 14, 1933 |
| 1,948,213 | Heltzel | Feb. 20, 1934 |
| 2,102,254 | Brockhurst | Dec. 14, 1937 |
| 2,226,886 | Willis | Dec. 31, 1940 |
| 2,228,052 | Gardner | Jan. 7, 1941 |
| 2,262,859 | Robertson | Nov. 18, 1941 |
| 2,321,067 | De Witt | June 8, 1943 |
| 2,353,981 | Wire | July 18, 1944 |
| 2,400,852 | Stevenson | May 21, 1946 |
| 2,431,104 | Bright | Nov. 18, 1947 |
| 2,493,264 | Records | Jan. 3, 1950 |

FOREIGN PATENTS

| | | |
|---|---|---|
| 646,268 | Great Britain | Nov. 15, 1950 |